United States Patent
Stern

Patent Number: 6,110,038
Date of Patent: Aug. 29, 2000

[54] SYSTEM FOR DETECTING AND PURGING CARBON MONOXIDE

[76] Inventor: David A. Stern, 941 N. Norma Pl., Los Angeles, Calif. 90049

[21] Appl. No.: 09/190,798

[22] Filed: Nov. 12, 1998

[51] Int. Cl.[7] ..................................................... F24F 11/00
[52] U.S. Cl. ............................ 454/343; 340/527; 340/632
[58] Field of Search .................................... 454/239, 256, 454/343; 340/632, 634, 527

[56] References Cited

U.S. PATENT DOCUMENTS

| | | | |
|---|---|---|---|
| 3,826,180 | 7/1974 | Hayashi | 454/342 |
| 5,074,137 | 12/1991 | Harris et al. | 73/31.02 |
| 5,576,739 | 11/1996 | Murphy | 340/825.06 |

FOREIGN PATENT DOCUMENTS

| | | | |
|---|---|---|---|
| 57-184844 | 11/1982 | Japan | 454/343 |

*Primary Examiner*—Harold Joyce
*Attorney, Agent, or Firm*—Ted Masters

[57] ABSTRACT

A system for detecting and purging carbon monoxide from a confined space such as a parking garage, includes a plurality of carbon monoxide detectors (A) where each detector provides a detection signal (22) if a threshold level of carbon monoxide is detected. An activation circuit (B) receives the detection signal (22) from one or more of the detectors (A) and provides an exhaust fan activation signal (24). A motor starter (C) receives (1) the exhaust fan activation signal (24), and (2) input power (26) such as 110 VAC or 220 VAC, so that when the exhaust fan activation signal (24) is received from the activation circuit (B), the motor starter (C) provides a switched power output (28). An exhaust fan (D) receives the switched power output (28) from the motor starter (C) so that the exhaust fan (D) operates and thereby purges the carbon monoxide from the space. In a preferred embodiment, the activation circuit (B) includes (1) a relay (E) which is activated by any one of the detection signals (22), and provides a control signal output (30), and (2) a timer (F) which upon receipt of the control signal (30) provides the exhaust fan activation signal (24) for a predetermined period. Also in a preferred embodiment, the plurality of carbon monoxide detectors (A) are strategically placed in different locations within the space so as to ensure carbon monoxide detection throughout the space.

1 Claim, 1 Drawing Sheet

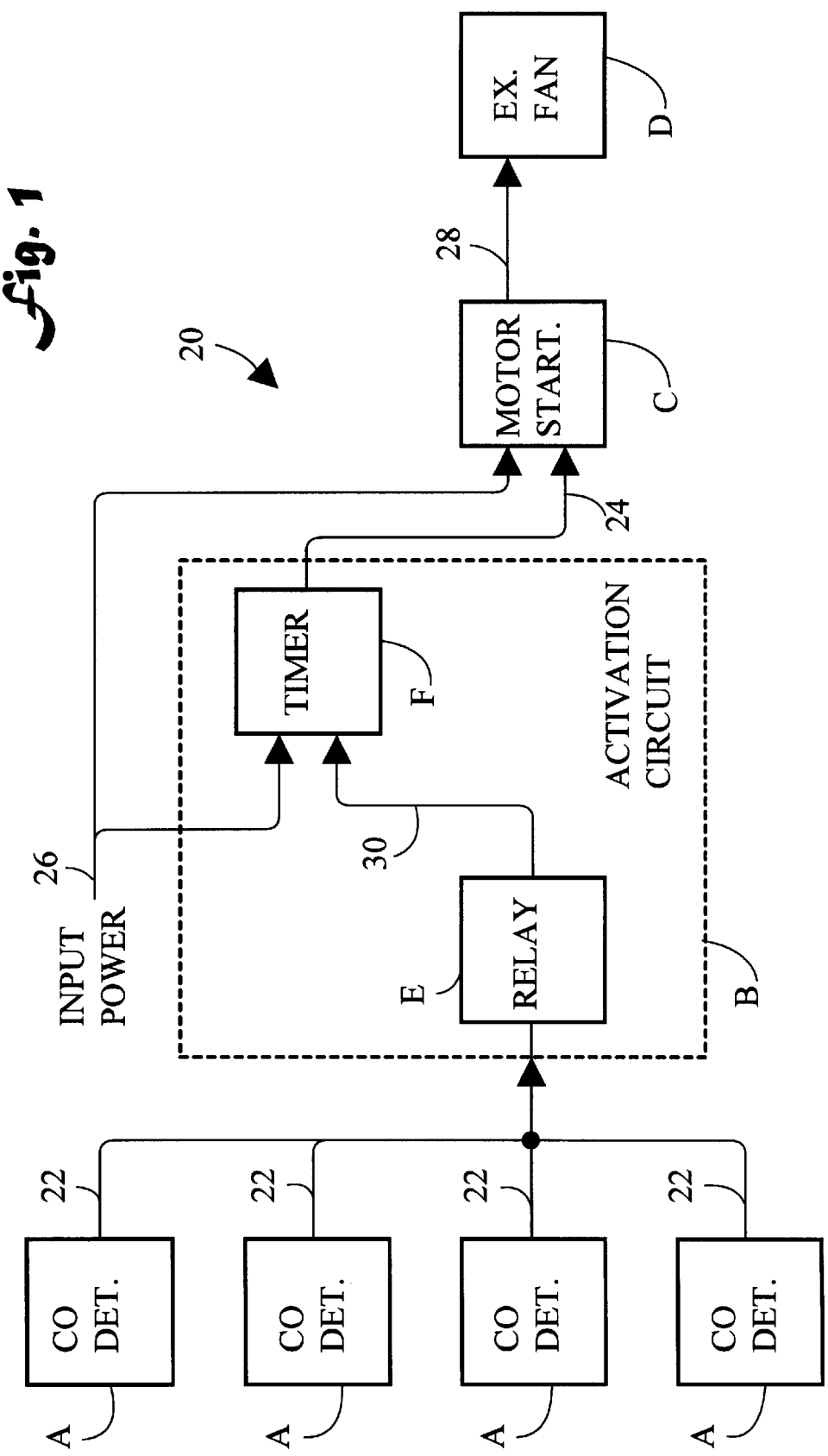

SYSTEM FOR DETECTING AND PURGING CARBON MONOXIDE

TECHNICAL FIELD

The present invention pertains to the unwanted and potentially dangerous buildup of carbon monoxide gas in a confined space such as an underground parking garage, and in particular to a system which detects the buildup of the gas and activates an exhaust fan to remove the gas from the space.

BACKGROUND ART

Devices and methods for detecting various gaseous elements are well known in the art. Devices and methods for ventilating occupied spaces are equally well known. For example, U.S. Pat. No. 4,164,172 illustrates a method and apparatus for ventilating an occupied space. The method and apparatus controls the amount of outside air introduced into a given space being ventilated as a function of the oxygen content of the air in the space to minimize the energy expended in heating or cooling air flowing through the space while maintaining the oxygen content of the air above that required for well-being of humans occupying the space. A fuel cell produces an electric current the magnitude of which is a function of the partial pressure of the oxygen present in the air surrounding the fuel cell. The output of the fuel cell is applied to a control circuit of a damper motor to admit outside air when the partial pressure of the oxygen in the occupied space falls to a predetermined minimum level and to exclude outside air and to recirculate return air when the partial pressure of the oxygen in the space rises to a certain maximum level. U.S. Pat. No. 4,478,048 shows an air sensing control system for air conditioners. A unitary air conditioner unit is adapted to be mounted through a wall opening of an enclosure to be conditioned including an air sensing system operative for generating a signal dependent on the level of gases in the enclosure air. The control is operable for adding outside air to the circulating enclosure air or for exhausting enclosure air when a first level of gases sensed and for causing an alarm to sound when the level of gases is above a predetermined value. U.S. Pat. No. 5,120,271 defines a ventilating arrangement for a car. The ventilating system includes an exhaust fan, a carbon monoxide detector, and tubes for evacuating air from the interior of the car if carbon monoxide is present in it. The system can be provided also with a manual fan-operating switch, and formed as a unit which is easily mountable in a car. U.S. Pat. No. 5,267,897 discloses a method and apparatus for ventilation measurement via carbon dioxide concentration balance. The apparatus and method indirectly determines the amount of outside air introduced into the ventilation system of a structure. Carbon dioxide concentrations are measured for return air, outside air and mixed air. The flow rate of mixed air is measured. The volume of outside air introduced into the system is determined without directly measuring the volume of flow rate of the outside air. For calibrating the apparatus, a return air sensor is calibrated to the outside air and a mixed air sensor is calibrated to the outside air or the return air to eliminate inaccuracy due to sensor drift. U.S. Pat. No. 5,292,280 portrays a method and apparatus for controlling ventilation rates and indoor air quality in an HVAC system. The apparatus and method indirectly determines the amount of outside air introduced into the ventilation system of a structure to control the indoor air quality in the structure. Test gas concentrations, preferably carbon dioxide concentrations, are measured for return air, outside air, and mixed (supply) air. The flow rate of mixed air is measured. The volume of outside air introduce into the system is determined through use of the test gas concentration measurements without directly measuring the volume or flow rate of outside air. Preferably, a single sensor is utilized to measure each of the trace gas concentrations in the return air, outside air and supply air, and the various measurements sequentially multiplexed to a controller. U.S. Pat. No. 5,331,310 comprises an amperometric carbon monoxide sensor module for residential alarms. A relatively inexpensive modular component can be substituted for, or used in conjunction with, and existing smoke detector in a commercially available residential fire-detection alarm. The invention comprises an amperometric sensor for carbon monoxide, and a simple current-to-voltage converter circuit that converts the current signals from the sensing electrode into amplified voltage signals. An alarm fitted with this module provides early warning of hazardous conditions, such as a smoldering fire, a leaky furnace, or an otherwise heavily polluted atmosphere. U.S. Pat. No. 5,379,026 consists of a carbon-monoxide detector and alarm circuit for alerting occupants of a structure to a presence of a toxic gas. The apparatus utilizes a probe to detect carbon-monoxide within an air duct of a conventional furnace installation. A siren and a flashing red light are both activated upon a detection of a predetermined amount of carbon monoxide within the air duct, thereby alerting the occupant to the presence of such carbon-monoxide. U.S. Pat. No. 5,576,739 describes a carbon monoxide safety system. The system measures noxious gas concentration in an affected space and for controlling the device producing the noxious gas for decreasing the concentration of the as in the affected space. The invention is particularly described in relation to measuring carbon monoxide concentration in an automobile garage and for controlling the garage door opener circuit to open the garage door in response to a preselected concentration of carbon monoxide. Also, described in particular is a system for deactivating a furnace operating circuit to turn off the furnace in the event of excessive carbon monoxide concentrations. U.S. Pat. No. 5,694,118 includes a gas detection and alarm system for monitoring gas such as carbon monoxide in the atmosphere which can be harmful to humans. The invention has a gas detection/alarm device comprising a detection circuit which detects a predetermined dose of a gas such as carbon monoxide, an indication circuit which visually and audibly indicates the dose detection to the user based on the detection circuit, a microprocessor for digitally operating the detection circuit and the indication circuit, a power conversion circuit which converts AC power to DC power without using any transformers and which supplies the converted constant power to the detection circuit, indication circuit and microprocessor, and a housing which compactly houses all of the components.

DISCLOSURE OF INVENTION

The present invention pertains to a system for removing dangerous carbon monoxide gas from a confined space such as a parking garage. The system comprises a plurality of carbon monoxide detectors (sensors) which are placed at strategic locations in the space. Whenever one of the detectors senses a level of carbon monoxide which exceeds a pre-established threshold level, a detection signal is generated. The detection signal is received by an activation circuit which in turn applies input power to a motor starter. The motor starter applies switched power to an exhaust fan which activates and purges the carbon monoxide-laden air from the space. A timer causes the exhaust fan, once activated, to operate for a predetermined period in order to sufficiently purge the gas from the space. Also, the timer activates the fan for a predetermined period whenever input power is restored (as from a power failure). This is useful in purging the gas buildup which can occur when the exhaust fan is incapable of normal operation due to the power failure.

In accordance with a preferred embodiment of the invention, a system for detecting and purging carbon monoxide from a confined space such as a parking garage, includes a plurality of carbon monoxide detectors distributed throughout the space. If any of the detectors senses a threshold level of carbon monoxide, a detection signal is provided to an activation circuit, which in turn generates an exhaust fan activation signal. The exhaust fan activation signal is applied to a motor starter which then therefor input power to an exhaust fan.

In accordance with an important aspect of the invention, the activation circuit includes a relay, and a timer which ensures that the activation signal persists for a predetermined period even if the carbon monoxide drops below the threshold level.

In accordance with an important feature of the invention, the exhaust fan will also operate for a predetermined period when power comes back on after a power outage.

Other features and advantages of the present invention will become apparent from the following detailed description, taken in conjunction with the accompanying drawings, which illustrate, by way of example, the principles of the invention.

BRIEF DESCRIPTION OF DRAWINGS

FIG. 1 is a schematic block diagram of a system for detecting and purging carbon monoxide in accordance with the present invention.

MODES FOR CARRYING OUT THE INVENTION

Referring initially to FIG. 1, there is illustrated a schematic block diagram of a system for detecting and purging carbon monoxide from a space in accordance with the present invention, generally designated as 20. System 20 includes a plurality of carbon monoxide detectors A, each of which provides a detection signal 22 if a threshold level of carbon monoxide is detected. In the shown embodiment four detectors A are utilized. It may be appreciated however, that any number of detectors A could be employed, including only a single detector A. An activation circuit B receives the detection signal 22 from any of the carbon monoxide detectors A, and provides an exhaust fan activation signal 24. A motor starter C receives (1) the exhaust fan activation signal 24, and (2) input power 26, such as 110 VAC or 220 VAC, so that when the exhaust fan activation signal 24 is received from the activation circuit B, the motor starter C provides a switched power output 28. An exhaust fan D receives the switched power output 28 from the motor starter C so that the exhaust fan D operates and thereby purges the carbon monoxide from the space.

In a preferred embodiment, the activation circuit B further includes (1) a relay E which is activated by any one of the detection signals 22, and provides a control signal output 30 to a timer F. Upon receipt of the control signal 30, timer F provides the exhaust fan activation signal 24 for a predetermined period. The exact predetermined period will depend upon the size of the space, carbon monoxide buildup rate, other system parameters, and requirements established by federal, state, and local governments. A period of about 10 minutes could be useful. Also, timer F provides the exhaust fan activation signal 24 whenever input power is turned on (or restored) from an off condition.

While the present invention is particularly suited to a plurality of carbon monoxide detectors, the principles can also apply to a system having a single detector.

In a preferred embodiment, the specific system components include:

First Alert #NICO, carbon monoxide detector A
7603K28, 110 VAC magnetic motor starter C
7603K48, 220 VAC magnetic motor starter C
Tuttle & Bailey types BRE/DRE, exhaust fan D The preferred embodiments of the invention described herein are exemplary and numerous modifications, dimensional variations, and rearrangements can be readily envisioned to achieve an equivalent result, all of which are intended to be embraced within the scope of the appended claims.

I claim:

1. A system for detecting and purging carbon monoxide from a space, comprising:

a plurality of carbon monoxide detectors, said plurality of detectors each providing a detection signal if a threshold level of carbon monoxide is detected;

an activation circuit receiving said detection signal and providing an exhaust fan activation signal;

a motor starter receiving (1) said exhaust fan activation signal, and (2) input power, so that when said exhaust fan activation signal is received from said activation circuit, said motor starter provides a switched power output;

an exhaust fan receiving said switched power output from said motor starter so that said exhaust fan operates and thereby purges the carbon monoxide from the space;

a relay which is activated by any one of said detection signals, and provides a control signal output;

a timer which upon receipt of said control signal provides said exhaust fan activation signal for a predetermined period, said predetermined period being about 10 minutes;

said timer providing said exhaust fan activation signal whenever input power is turned on from an off condition; and, said timer providing said exhaust fan activation signal whenever input power comes back on after a power outage.

* * * * *